United States Patent [19]

Krolak et al.

[11] Patent Number: 5,751,990
[45] Date of Patent: May 12, 1998

[54] ABRIDGED VIRTUAL ADDRESS CACHE DIRECTORY

[75] Inventors: David John Krolak, Dodge Center; Lyle Edwin Grosbach, Rochester; Sheldon B. Levenstein, Rochester; John David Irish, Rochester, all of Minn.

[73] Assignee: International Business Machines Corporation, Armonk, N.Y.

[21] Appl. No.: 233,654

[22] Filed: Apr. 26, 1994

[51] Int. Cl.⁶ .................................................. G06F 12/08
[52] U.S. Cl. ........................ 395/417; 395/403; 395/445
[58] Field of Search ................................ 395/416, 417, 395/403, 410, 421.06, 421.07, 421.1, 445, 463, 487

[56] References Cited

U.S. PATENT DOCUMENTS

| | | | |
|---|---|---|---|
| 4,488,256 | 12/1984 | Zolnowsky et al. | 395/420 |
| 4,490,782 | 12/1984 | Dixon et al. | 395/463 |
| 4,680,700 | 7/1987 | Hester et al. | 395/416 |
| 4,682,281 | 7/1987 | Woffinden et al. | 395/417 |
| 5,060,137 | 10/1991 | Bryg et al. | 395/250 |
| 5,101,341 | 3/1992 | Circello et al. | 395/375 |
| 5,226,133 | 7/1993 | Taylor et al. | 395/417 |
| 5,255,384 | 10/1993 | Sachs et al. | 395/417 |
| 5,353,424 | 10/1994 | Partovi et al. | 395/455 |
| 5,386,527 | 1/1995 | Bosshart | 395/403 |
| 5,392,410 | 2/1995 | Liu | 395/403 |
| 5,479,627 | 12/1995 | Khalidi et al. | 395/415 |
| 5,493,660 | 2/1996 | DeLano et al. | 395/416 |
| 5,530,829 | 6/1996 | Beardsley et al. | 395/440 |
| 5,535,351 | 7/1996 | Peng | 395/417 |
| 5,564,052 | 10/1996 | Nguyen et al. | 395/800 |

OTHER PUBLICATIONS

Su, Ching-Long et al. "A Study of Cache Hashing Functions for Symbolic Applications in Micro-parallel Processors", Proceedings of the 1994 International Conference on Parallel and Distributed Systems, IEEE., 1994.

Primary Examiner—Tod R. Swann
Assistant Examiner—Conley B. King, Jr.
Attorney, Agent, or Firm—Andrew J. Dillon

[57] ABSTRACT

A hierarchical memory utilizes a translation lookaside buffer for rapid recovery of virtual to real address mappings and a cache system. Lines in the cache are identified in the cache directory by pointers to entries in the translation lookaside buffer. This eliminates redundant listings of the virtual and real addresses for the cache line from the cache directory allowing the directory to be small in size. Upon a memory access by a processing unit, a cache hash address is generated to access a translation lookaside buffer entry allowing comparison of the address stored in the TLB entry with the address of the memory access. Congruence implies a hit. Concurrently, the cache hash address indicates a pointer from the cache directory. The pointer should correspond to the cache hash address to indicate a cache directory hit. Where both occur a cache hit has occurred.

18 Claims, 7 Drawing Sheets

ABRIDGED VIRTUAL ADDRESS CACHE DIRECTORY

BACKGROUND OF THE INVENTION

1. Technical Field

The present invention relates in general to hierarchical memories for computers and in particular to cooperative cache directory and translation lookaside buffer systems for determining occurrence of a copy of a record in a high level of a hierarchical memory from a virtual address. Still more particularly, the present invention relates to reducing redundant information stored between the translation lookaside buffer, servicing virtual storage, and the cache directory, servicing the high level of the memory.

2. Description of the Related Art

Random access memory (RAM) is, in most contemporary computers, the chief element of the system memory. Access to any location in random access memory requires a fixed amount of time, regardless of the sequence of accesses. Each location in random access memory is accessed using an address. The collection of these addresses usually corresponds to the real address space of the computer.

The use of random access memory enhances the performance of general purpose computers over the use of other types of memory, e.g. sequential access memory. Among other factors, computer programs do not need to be organized so that the bulk of accesses are sequential. However, sequential access memory is generally much cheaper per unit of data stored than random access memory.

Moreover, memory accesses by a computer program upon execution are rarely, if ever, purely random. They are in a general way subject to fairly reliable prediction. The class of phenomena observed for computer program memory accesses are collectively referred to as locality of reference. Locality of reference includes temporal correlation behavior and spatial locality behavior. Temporal correlation is the tendency for accesses to a location to be repeated during an interval of time. An example of this would be provided by a program loop. Spatial locality is the tendency for memory references in random access memory to be physically clustered. Adjacent locations in RAM are sequentially numbered. Even though a program is not required to access adjacent locations, it frequently will, leading to a "clustering" of references.

Locality of reference phenomena in general purpose computers have been exploited both to enhance the performance of the computer's memory and to reduce its cost. Random access memory built with dynamic random access memory chips, while providing fairly good performance, does so at a relatively high cost per block of data as compared with peripheral storage devices such as disk and tape drives. Using RAM as system memory provides a buffer between peripheral storage and a computer central processing unit. This is to some extent dictated by the need for vastly more storage space than is cost effective to support with RAM. The selection of data to retain in system memory as against slow peripheral storage is advantageously based on the predictions of the locality of reference phenomena.

Further, given that memory accesses are predictable, there may be an advantage in exploiting extremely fast associative memory devices (i.e. memory devices where data is retrieved by key rather than address) to store some data which has a high probability of use in the near future. While associative memory devices may be considerably faster than RAM, they come at a still greater cost per block of data stored.

Fast associative memory, intermediate speed system memory RAM and slow peripheral storage taken together are organized as levels in a hierarchical memory. In hierarchical storage successive lower levels are provided by progressively larger, slower, and less costly per block stored elements. The memory is managed between adjacent levels. Data may be moved as required between levels, but such movements may come at a high cost in terms of processing time as against access to the data at the higher level.

Two schemes for managing a hierarchical memory are related through use of the locality of reference phenomena. One of these is the use of fast associative memory as a cache. A second is the use of virtual storage, that is the use of a virtual address space for program references.

Virtual storage is a memory system in which addresses generated by programs lie in an address space which is not part of the address space provided by the system memory RAM. A virtual address space will be much larger than physical memory, and thus references to virtual locations generated by programs may not be supported by system memory. In the prior art, a virtual address generated by a program has had to be translated to a physical address prior to access of system memory. If the data corresponding to the virtual address is not in system memory it must be paged in before the access can proceed. The process of address translation determines if pages are present in system memory and converts the virtual address of a page to a real address. Once an address has been satisfactorily translated, the program can proceed. The address translation process is very time consuming, so once a conversion is done the result may be saved in a translation lookaside buffer (TLB). The TLB is a cache like memory that holds recently used mappings of virtual addresses to real addresses. All current mappings of virtual to real addresses are stored as entries in a page table in system memory.

A cache is a relatively small, extremely high speed buffer typically occupying the highest level of the hierarchical memory (excepting CPU registers where considered part of memory). The contents of the cache are listed in a cache tag directory which holds a collection of tags used for associative access to cached data. In a computer system utilizing virtual storage, the cache tag directory array has become quite large. Cache directory entries have included most of the virtual address, namely the bits that the computer system uses to address memory less the number of bits needed to address the cache. Also retained in an entry is the corresponding real address. This is required since the system memory-RAM can only be accessed using real addresses, not virtual addresses. A processor must snoop memory activity caused by input/output operations of a direct memory access controller or other processors to determine if the activity has a consequence for the cache state. This is done by comparing the real addresses on the address bus against the real addresses in the cache tag directory entries. A cache tag directory entry also includes several status flags, e.g. valid, shared and changed, as well as parity or error correction code data. As address spaces (real and virtual) grow, the size of the cache tag directory grows geometrically compounding the problem of finding space for the structure.

Where both caching and a virtual address space are provided on a computer, space must be made available on very large scale integrated (VLSI) circuits for both translation lookaside buffers and for cache tag directories. Real and virtual addresses in the translation lookaside buffer for the virtual storage system is duplicated in the cache tag directory in normal operation. However, a method for allowing both systems to make use of one copy of the data, at considerable savings in storage space, has not previously been taught by the art.

SUMMARY OF THE INVENTION

It is therefore one object of the present invention to provide a high performance hierarchical memory for a data processing system.

It is another object of the present invention to provide cooperative cache directory and translation lookaside buffer.

It is yet another object of the present invention to provide a system and method for eliminating redundant information from the translation lookaside buffer and cache directory.

The foregoing objects are achieved as is now described in a hierarchical memory utilizing a translation lookaside buffer for rapid recovery of virtual to real address mappings and a cache system. Lines in the cache are identified in the cache directory by pointers to entries in the translation lookaside buffer. This eliminates redundant listings of the virtual and real addresses for the cache line from the cache directory allowing the directory to be small in size. Upon a memory access by a processing unit, a cache hash address is generated to access a translation lookaside buffer entry allowing comparison of the address stored in the TLB entry with the address of the memory access. Congruence implies a hit. Concurrently, the cache hash address indicates a pointer from the cache directory. The pointer should correspond to the cache hash address to indicate a cache directory hit. Where both occur a cache hit has occurred.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
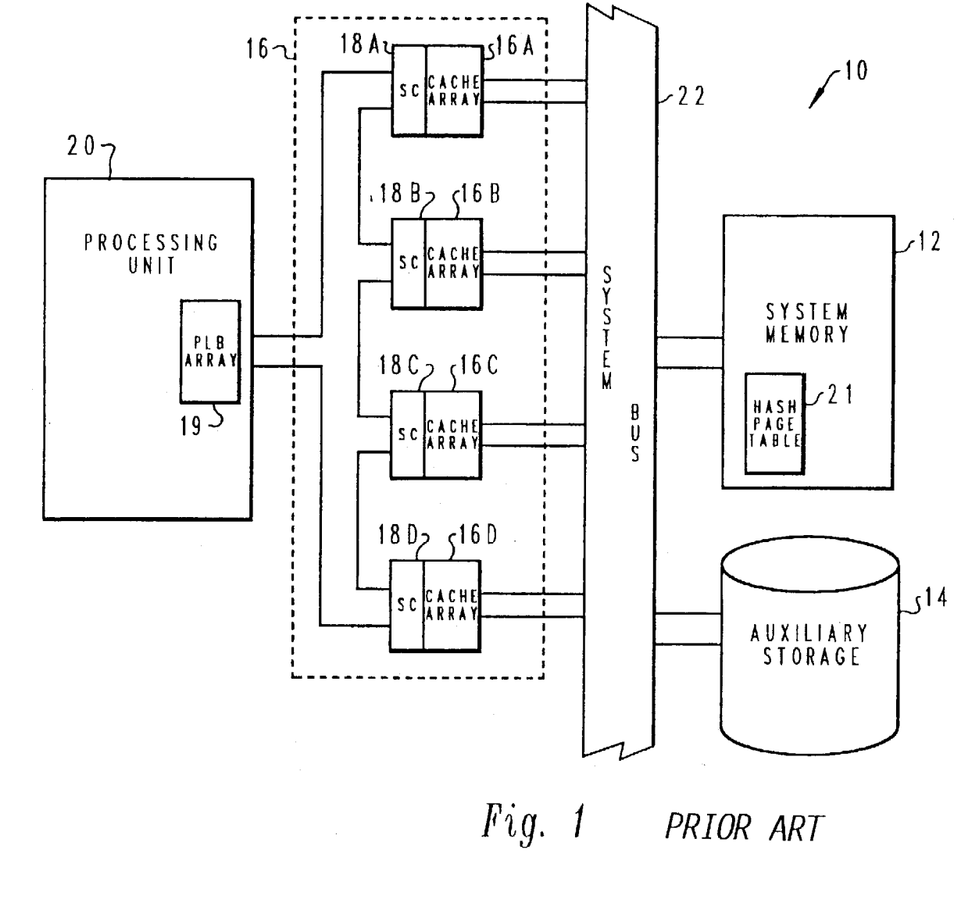
FIG. 1 is a block diagram of a computer system having a hierarchical memory in which the present invention maybe implemented.

FIG. 1 is a high level block diagram of a computer system 10 having a hierarchical memory system. The general architecture of computer 10 is conventional. Computer 10 may be provided by a computer such as an Applications System/400 available from International Business Machines Corporation, Rochester, Minn. The hierarchical memory system includes system memory 12, auxiliary storage 14 and a four-way associative cache 16. Cache 16 is the highest level of the hierarchical memory, while system memory 12 is an intermediate layer and auxiliary storage 14 is the lowest level. Four-way associative cache 16 includes cache arrays 16A, 16B, 16C and 16D. Each of cache arrays 16A, 16B, 16C and 16D is under the control of a storage controller, respectively 18A, 18B, 18C and 18D. Four-way associative cache 16 is logically interposed between processing unit 20 and system bus 22 so that memory accesses are serviced from cache, if possible. Memory accesses from processing unit 20 are done through cache 16. Where a two level lookaside buffer is utilized by the virtual storage system the primary lookaside buffer (PLB) 19 component of the translation lookaside buffer may be placed on the processing unit 20 integrated circuit. A hash page table 21 of all current virtual to real address mappings is stored in system memory 12. Only one hash page table 21 exists for all tasks. As is conventional in a hierarchical memory, the data in the higher levels generally duplicates data stored at lower levels.

Figure 2:
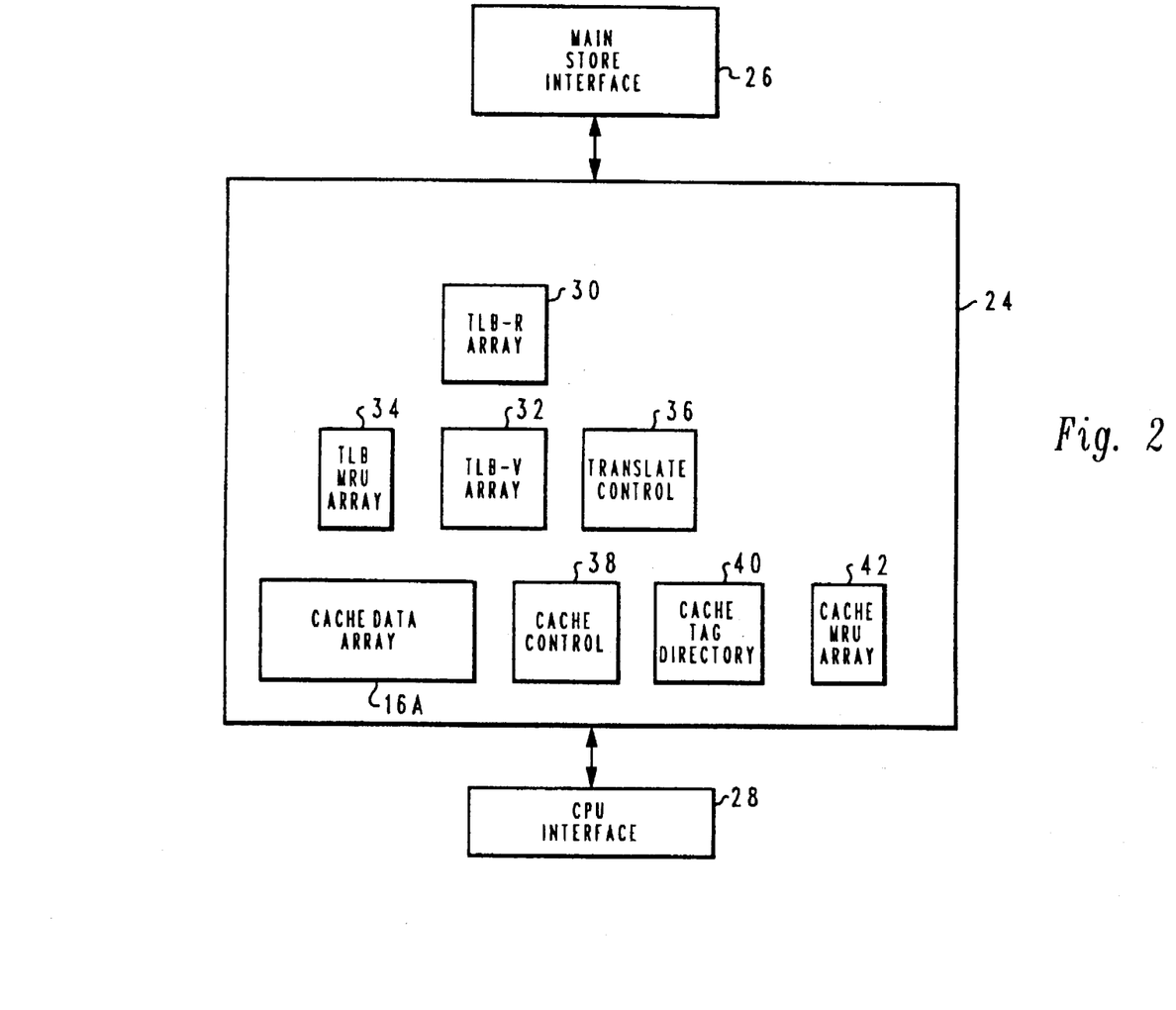
FIG. 2 is a block diagram of the principal data flow components of a translation and cache control integrated circuit in accordance with a preferred embodiment of the present invention.

FIG. 2 is a block diagram of some of the main data flow sections of storage controller 18A for an integrated circuit 24 which supports cache array 16A. Integrated circuit 24 is exemplary and may be used for cache arrays 16B, 16C and 16D. It is disposed between a main store interface 26 which handles data communication over system bus 22 and a CPU interface 28. The storage controller elements include a translation lookaside buffer (TLB) partitioned into TLB-R array 30 for real addresses, TLB-V array 32 for virtual addresses, a translation lookaside buffer most recently used array (TLB MRU array) 34, a translation control state machine 36, a cache control state machine 38, a cache tag directory 40 and a cache most recently used (MRU) array 42. In some embodiments TLB-R array 30 and TLB-V array 32 are merged.

Translation controller 36 refers to TLB-V array 32 and the TLB MRU array 34 to handle determination of page hits and page misses for the virtual addressing system. The TLB-V array 30 and TLB-R array 32 taken together provide a virtual address (VA) to real address (RA) map. Entries in TLB MRU array 34 are time stamped by last use and correspond to entries in the translation lookaside buffer in order to generate candidate pages for displacement from system memory 12 whenever a page miss occurs.

Cache controller 38 refers to a cache tag directory 40 upon each memory access to determine if a copy of the data for the address to be accessed is in cache data array 16A. A cache MRU array includes a time stamped entry corresponding to each line in the cache data array and is used for displacing cache lines to system memory 12. In accordance with the invention, cache tag directory 40 contains, in lieu of the virtual and real address tags, pointers to entries in the TLB-V and TLB-R arrays 30 and 32.

Figure 3:
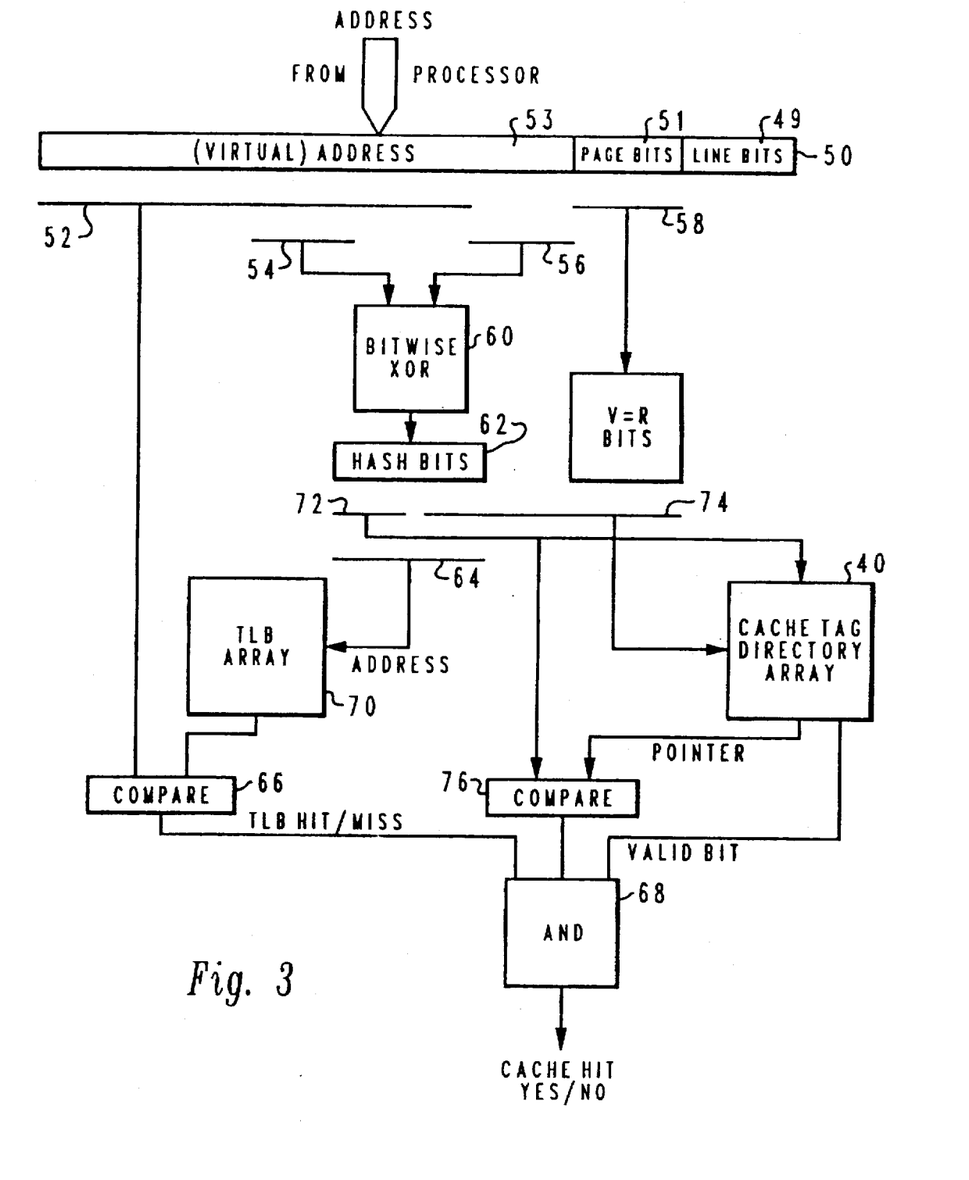
FIG. 3 is a data flow diagram of an operation for detecting cache hits in accordance with a preferred embodiment of the present invention.

FIG. 3 is a data flow diagram of a comparison operation. The translation controller state machine 36 and cache controller state machine 38 determine occurrence of a cache hit upon generation of an address by a program, provided a Primary Lookaside Buffer (PLB) hit has occurred. The primary lookaside buffer is a high speed subset of the translation lookaside buffer. A cache hit occurs if there is a translation lookaside buffer 70 hit concurrent with return of a valid pointer from the cache tag directory array 40 to the entry that was hit in TLB 70.

The details of block identification of a cache hit or miss depend upon the construction of virtual addresses for a computer and the mechanics of operations on the translation lookaside buffer. Virtual address 50 includes page bits field 51 and line bits field 49, which together are the bits for which the virtual and real addresses are the same or the V=R bits. Line bit field 49, which provides an offset into a line to a particular word, is ignored since only whole lines are cached. The offset into a line is not needed for identification of the line. Virtual address 50 also has a principal field 53 which includes every bit of the address which is not a V=R bit.

Detection of a translation lookaside buffer hit is conventional. However the address is hashed by hashing operation 62 to improve the cache hit rate and TLB hit rate. Portions 54 and 56 of principal field 53 are compared bit wise through an exclusive OR operation 60. If virtual address 50 has a current map into real memory, a copy of a portion 52 of the virtual address will exist at a location corresponding to address 64. Portion 52 is then compared with the contents of TLB array 70 retrieved by application of address 64 by a compare operation 66. A TLB hit is indicated by asserting the TLB hit line to AND gate 68.

When a line is cached, as occurs after a cache miss, hash address portion 72 of address 64 is stored as a pointer in cache tag directory 40 at an address 74 formed from the remaining bits of address 64 and V=R bits 58. Upon a memory access operation, address 74 is generated and applied to cache tag directory 40 and the pointer is compared with address field 72 by compare operation 76 to determine occurrence of a match. The status of a valid bit for the pointer from the location is concurrently passed to AND gate 68. The result of compare operation 76 is applied to AND gate 68.

If the entry in the cache tag directory is valid, and the results of both compare operation 66 and compare operation 76 indicate hits for the respective arrays, then a cache hit has occurred. A cache miss is indicated if compare operation 66 indicates a hit but compare operation 76 does not.

A caching system for a computer provides for block placement, block identification, block replacement and write strategy. While the invention is concerned with efficient block identification, the efficient identification strategy described above has a number of implications for the block replacement and write strategies.

Figure 4:
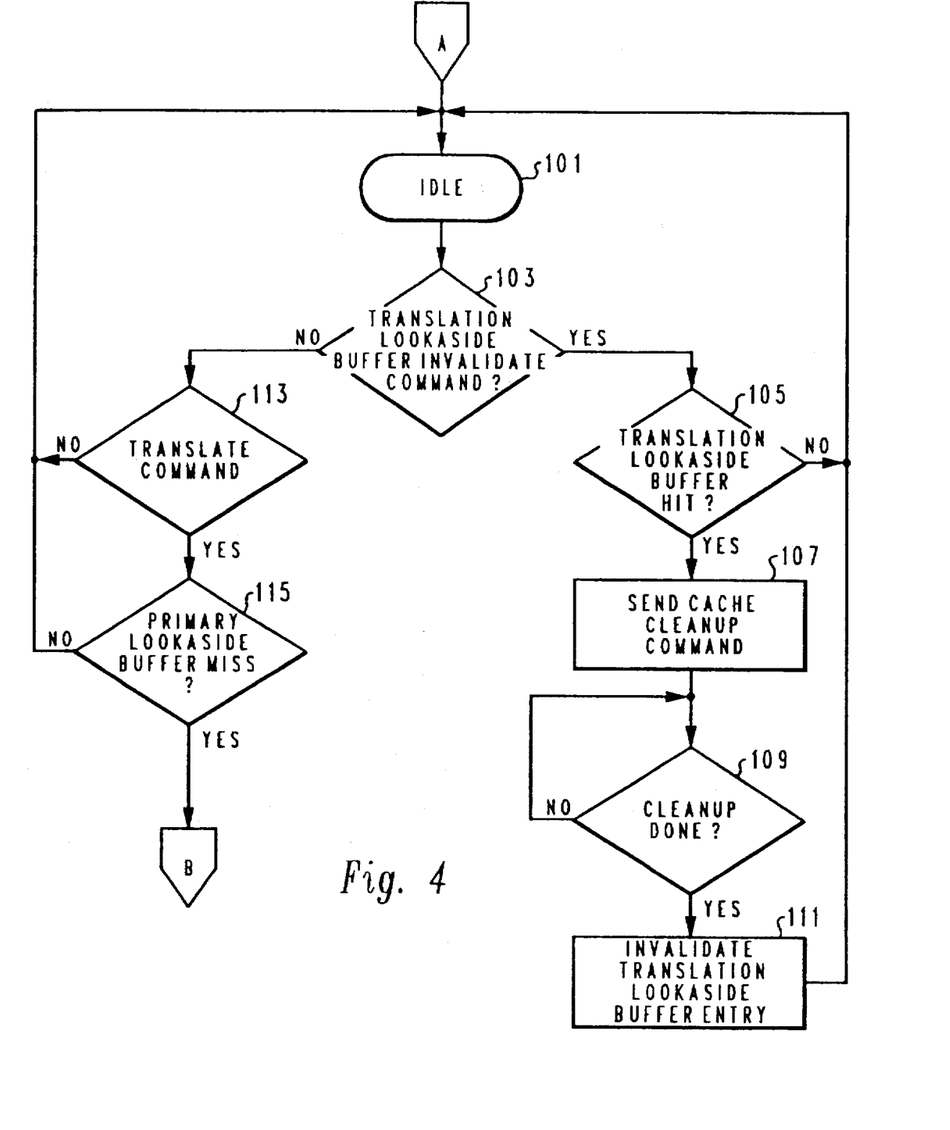
FIG. 4 is a high level flowchart of a translation control program in accordance with a preferred embodiment of the present invention.

FIG. 4 is a high level logical flow chart for a translation controller partition. For purposes of describing the translation controller partition, it is assumed that a two-level translation lookaside buffer, including a primary lookaside buffer is in use. In order to get a cache hit, a processing unit must first get a primary lookaside buffer hit. With the PLB hit indication the processing unit sends the 4-way cache circuit the associativity class of the TLB entry from which the PLB was loaded. As described above, the cache hash address defines which TLB congruence class is being used. This information tells us which TLB entry may contain the virtual address being used. The process is in an idle state 101 until receipt of a command. At step 103 it is determined if the command is one to invalidate an entry in the translation lookaside buffer. If the result of step 103 is affirmative, step 105 is executed to determine if the entry is in the translation lookaside buffer. If no such entry is present (i.e. a TLB miss), there is nothing to invalidate and the operation is complete. Processing returns to idle state 101.

Invalidation of a TLB entry requires prior invalidation of any cache directory entry pointing to it. A translation lookaside buffer should cover significantly more address space than a cache and have as many associativity classes as possible for performance reasons. If a TLB hit occurred at step 105, step 107 is executed to send a cache cleanup command. The processing associated with cache cleanup is described in connection with FIG. 7. Step 109 is an idle loop executed until the cleanup operation is complete. Thereafter step 111 is executed to reset the valid bit of the translation lookaside buffer entry to invalid. Processing then returns to idle state 101.

If the command is not a TLB entry invalidate command, step 113 is executed along the NO branch to determine if the command is a translate command. If the command is not a translate command, processing returns to the idle state 101. If the command is a translate command, step 115 is executed to determine if a primary lookaside buffer miss has occurred. Indication of such a miss is supplied by the processing unit. If a PLB hit was indicated, processing returns to the idle state 101 along the NO branch from step 115. Otherwise processing continues by connector B to FIG. 5.

Figure 5:
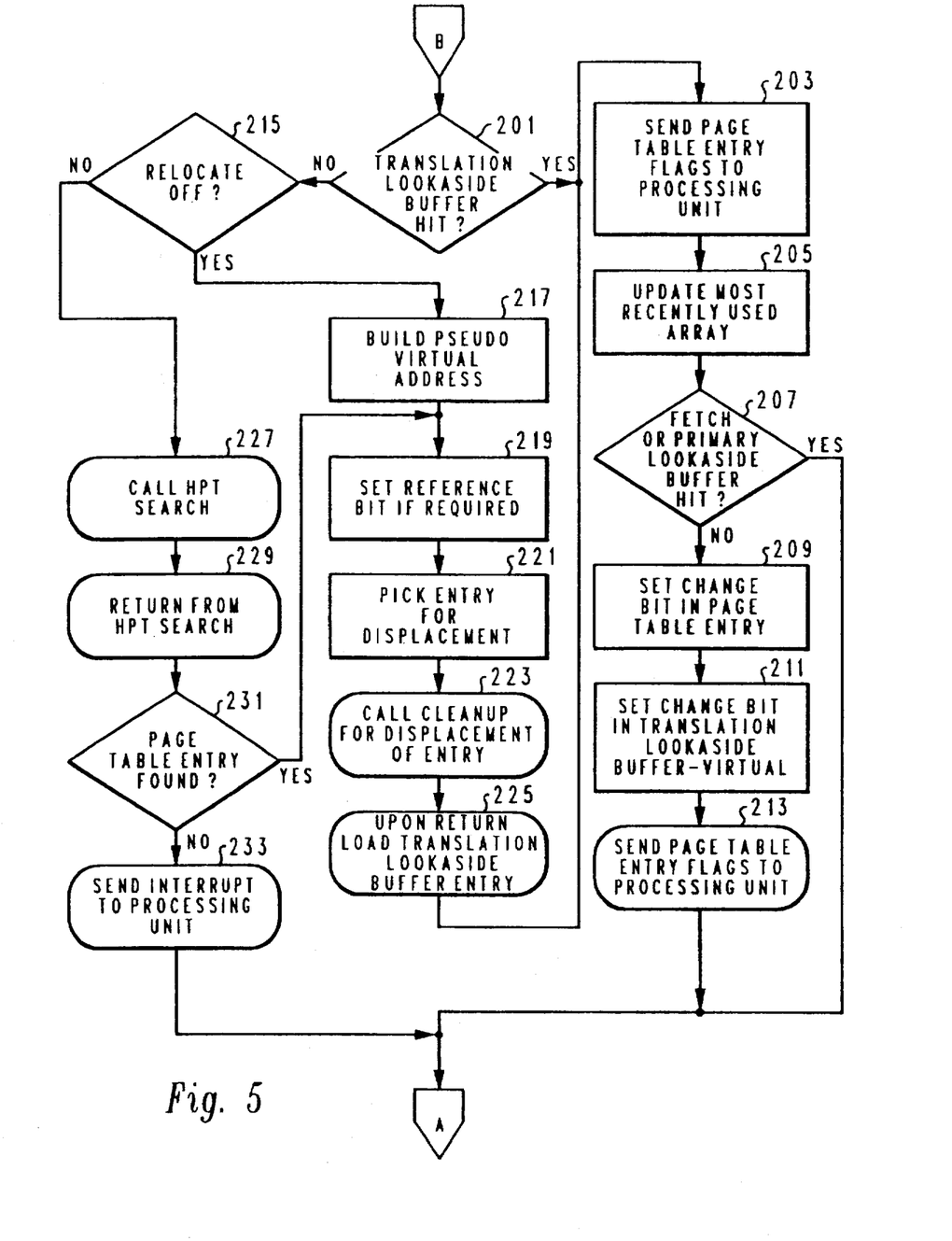
FIG. 5 is a continuation of FIG. 4.

FIG. 5 is a continuation of the flow chart of FIG. 4. Step 201 is executed following the yes branch from step 115. In step 201 it is determined whether a translation lookaside buffer hit has occurred. If a TLB hit has occurred, step 203 is executed to send the page table entry (PTE) flags for an accessed block to the processing unit. Next, the TLB most recently used array is updated (step 205). Step 207 is then executed to determine if a fetch or primary lookaside buffer hit has occurred. This inquiry does not directly concern the invention, but relates to marking records to indicate updates so that they are stored to auxiliary storage if and when paged out of system memory. If the operation is a fetch, or a primary lookaside buffer hit has now occurred (for example, after taking the NO branch from step 201), processing returns to the idle state 101. If the operation is not a fetch, or the condition remains one of a primary lookaside buffer miss, the NO branch is taken to step 209 to set a change bit in the page table entry for the accessed block and step 211 to set the change bit for the corresponding entry in the translation lookaside buffer (particularly the TLB-V array where used). Next, at step 213 the page table entry flags are sent to the processing unit. Processing then returns to the idle state 101.

The possibility that virtual addressing is not being used, or that a received virtual address is for data which is in system memory, or in auxiliary storage, but not in cache must be allowed for. Because of the constrained size of the cache tag directory, items which are cached for a process utilizing real addresses must nonetheless be identified in the translation lookaside buffer. This occurs even though such addresses are not translated. If step 201 indicates a translation lookaside buffer miss (i.e. the NO branch) step 215 is used to determine if the address received was a virtual address. This is done by examining the value of a relocate bit. If the relocate bit is off, step 217 is executed to build a pseudo virtual address through a pseudo translation operation performed on the real address. This provides the contents of an entry for the translation lookaside buffer. A subsequent access to the address should now generate a TLB hit even though the address is real. Next, at step 219, a reference bit is set if required. Step 219 concerns placing indication in the hash page table in system memory that a block has been used. The operation concerns aging of items for the virtual storage replacement algorithm, but does not directly concern the invention. Occurrence of a TLB miss after the TLB has filled implies displacing an entry from the TLB to make room for the missed entry. Step 221 represents execution of a least recently used algorithm to select an entry for displacement from the translation lookaside buffer. Next, step 223 provides for cleanup of the entry to be displaced, if any. Step 225 provides for loading of an entry for the newly accessed data into the translation lookaside buffer. Processing then continues with step 203 as described above.

The NO branch from step 215 is an indication that a virtual address from the processing unit is not in the translation lookaside buffer. Step 227 is executed to call for a search of the hash page table (HPT) to determine if a mapping to a real address for the virtual address exists. This is equivalent to asking if the data is in the system memory. Step 229 represents return from the HPT search. At step 231 it is determined if a page table entry for the virtual address was found. If yes, processing may continue with step 219 as described above.

If no page table entry was returned from the HPT search, a page fault has occurred. Following the NO branch from step 231, step 233 represents the sending of an interrupt to the processing unit to handle the page fault. A page fault is extremely time consuming relative to the operations discussed for the translation controller and accordingly the process returns to the idle state 101 for execution of intervening commands while the page fault is handled.

Figure 6:
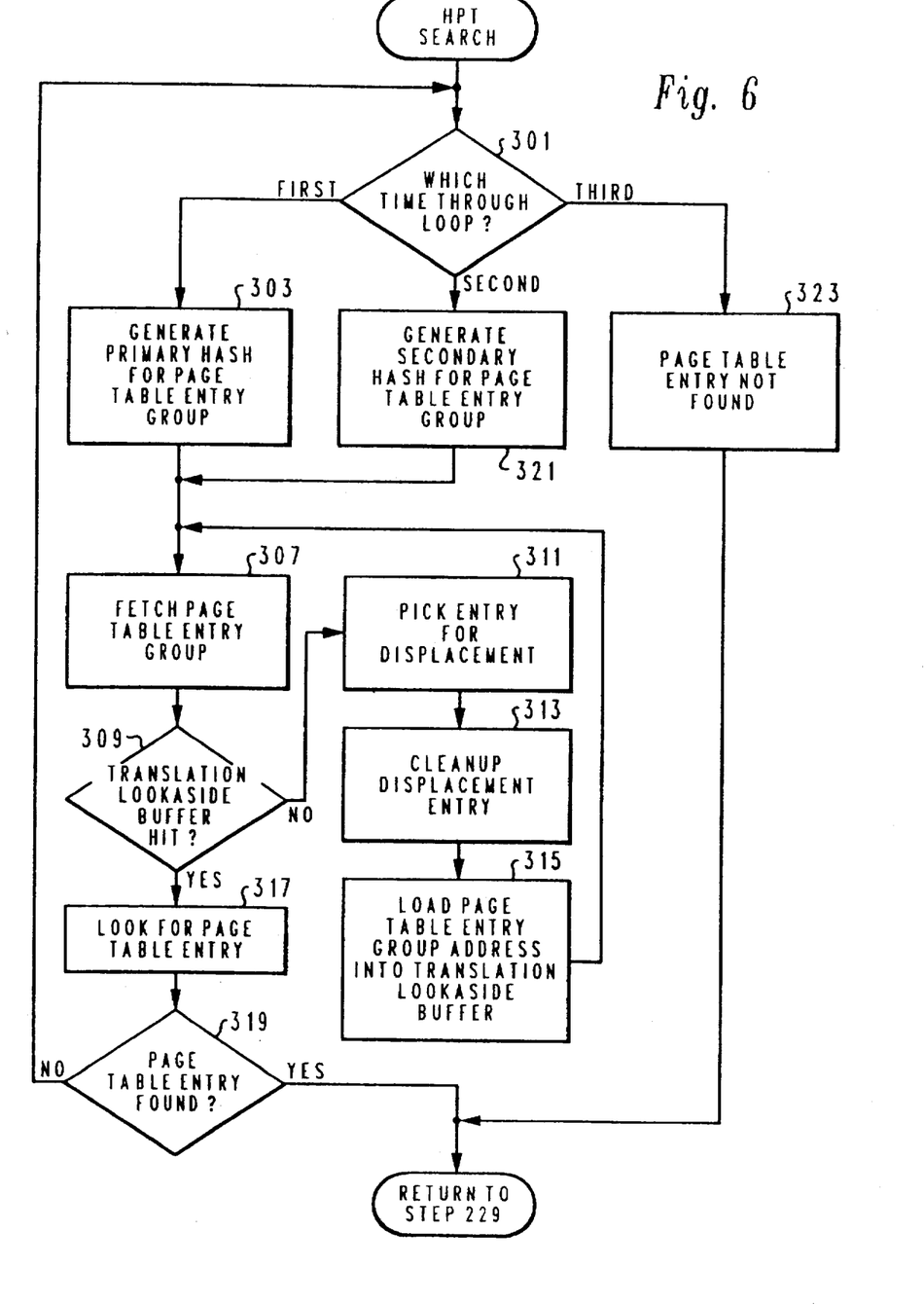
FIG. 6 is a flowchart for a process of searching a hash page table in accordance with a preferred embodiment of the present invention.

FIG. 6 is a logical flow chart of a process for handling a hash page table search entered from step 227. Step 301 provides for looping control by based upon the number of times the loop has been executed. On the first time through the search process step 303 is executed to generate the primary hash for the page table group. Next, at step 307 the page table entry group is fetched. Step 309 provides for looping control through steps 311–315 and 307 by determining occurrence of a translation lookaside buffer hit. As long as no hit occurs the process loops through the indicated steps. At step 311 an entry is picked for displacement. Step 313 provides for cleanup of the displaced entry. With step 315 the page table entry group fetched at step 307 is loaded into the translation lookaside buffer. Processing then returns to step 307. Once a TLB hit occurs looping is exited. Step 317 is executed to look for an entry for the desired page table. Step 319 determines if the desired page table entry was found. If it was, processing is returned to step 229. If it was not, processing is returned to step 301.

The second loop through the HPT search is identical to the first loop except that step 321 provides for generation of a secondary hash for the page table entry group. Having a second hash allows more space to be allocated in system memory for page table entries. If the second loop fails to find a page table entry none exists. The third branch from step 301 is taken. Step 323 in the third loop reflects a page fault, indication of which is returned to step 229.

Figure 7:
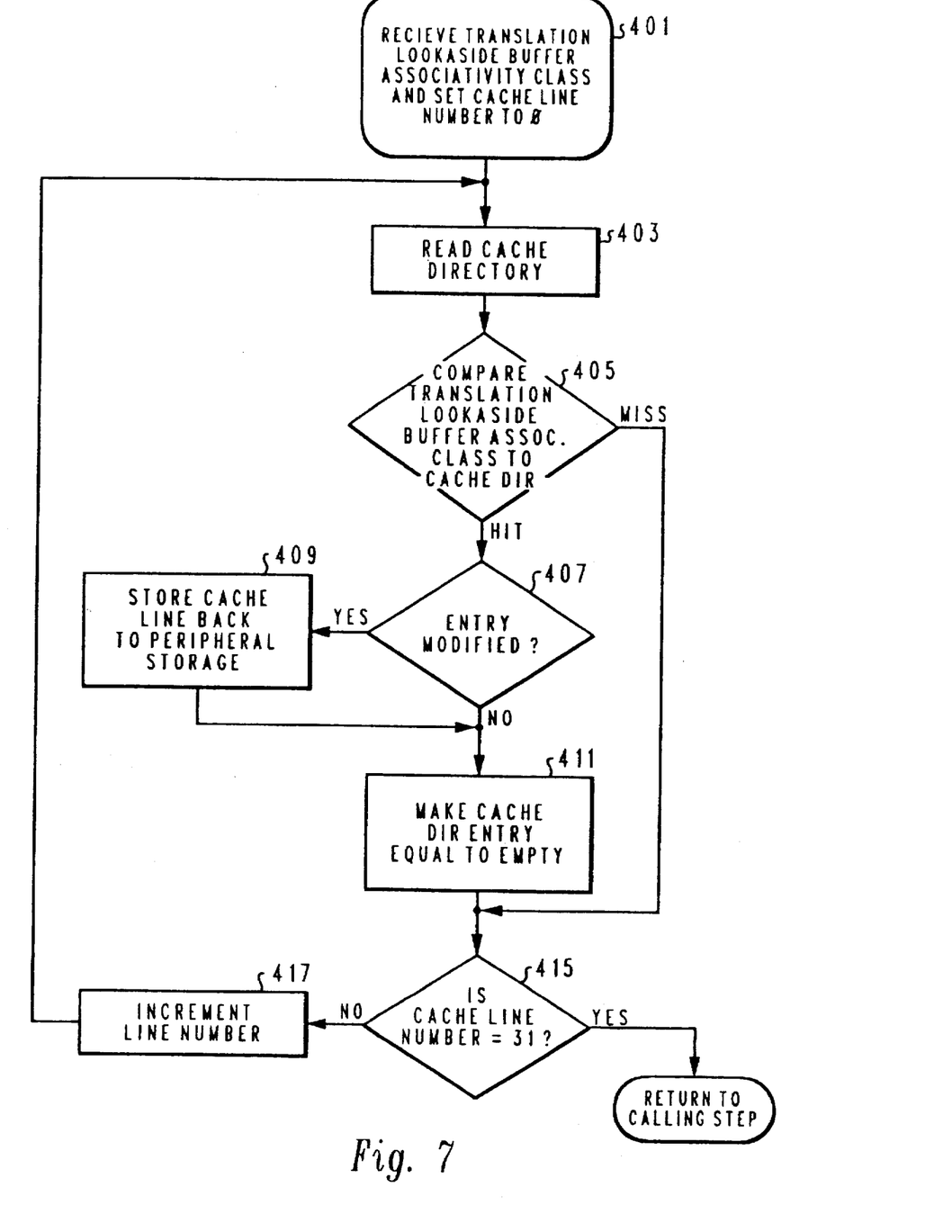
FIG. 7 is a flowchart of a cache cleanup process in accordance with a preferred embodiment of the present invention.

FIG. 7 is a cache tag directory cleanup operation entered at step 401 upon a call from step 107. The operation provides for releasing cache space used for a TLB associativity class. In step 401 the cache line number is initialized. Next, in step 403 the cache directory at the indicated line is read. With step 405 the cache directory tag read is compared to the translation lookaside buffer. If there is a hit, it is determined from the status flags if the line for the cache directory entry has been modified at step 407. If the line has been modified, step 409 is executed to store the cache line back to system memory or auxiliary storage. Following step 409, or along the NO branch from step 407, step 411 is executed make the cache tag directory entry empty.

Step 415 provides for determining if all lines of a cache have been checked. Step 415 follows step 411 or following determination of a miss at step 405. In step 415 it is determined if the count for the cache line number has reached the last line. If it has not, step 417 is executed to increment the line number and processing is returned to step 403. If the cache line number is equal to the number of the last line in the cache (the lines in the example are numbered 0–31) then the entire cache tag directory has been checked. Processing then returns to the calling step.

Addressing of the cache tag directory, the translation lookaside buffer and the cache must be done in the same way wherever there is overlap in the coverage of system memory. If the translation lookaside buffer is N-way associative, then $\log_2 N$ bits must be added to the each pointer in the cache tag directory. If the translation lookaside buffer is content addressable memory, then the content addressable memory must output which of its addresses was hit, and the same address bits must exist in the pointer field of a cache tag directory entry.

With use of the invention, the size of a cache tag directory may be considerably reduced over the prior art. For a computer utilizing 40 bit virtual addresses and 36 bit real addresses consider an 8 Kbyte cache. A cache directory in a conventional system might extend to 128 words by 54 bits. Properly arranged, up to 50 bits of address information in the cache may be replaced by a 2 bit pointer by utilizing the invention. Cache directory size, including status flags may to reduced to 128 words by 6 bits for an 89% reduction in size. The space savings increase as cache, virtual address space, real address space or page to cacheline size ratio grow. If the processor is a multiple chip partition, many pins are saved by eliminating a real address bus interconnecting the partitions. If there is a two level TLB (i.e. a primary lookaside buffer (PLB) and a TLB), an array for holding real addresses in the PLB is eliminated. The cache address compare now occurs in parallel with the virtual address compare and no real address compare is done at all, as is done in prior art caches.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for accessing a hierarchical memory system utilizing an address, wherein said data processing system includes a processor and said hierarchical memory system includes a cache memory indexed by a cache directory and a main memory indexed by a translation lookaside buffer, said method comprising the steps of:

transmitting an associativity set corresponding to a requested virtual address from said processor to said cache directory in response to an attempted access of said hierarchical memory system;

performing a hashing function on an upper portion of said requested virtual address;

locating a first entry in said translation lookaside buffer corresponding to said hashed upper portion of said requested virtual address;

locating an entry in said cache directory utilizing a lower portion of said requested virtual address, said entry in said cache directory including a congruence class field and having an associated data block in said cache memory;

locating a second entry in said translation lookaside buffer utilizing a pointer which includes said congruence class field and said transmitted associativity set; and comparing said first entry in said translation lookaside buffer and said second entry in said translation lookaside buffer to verify the validity of data within said data block for said requested virtual address.

2. The method according to claim 1 further comprising the steps of:

accessing said data within said data block for utilization by said processor responsive to said first entry being equal to said second entry of said translation lookaside buffer.

3. The method of according to claim 1, wherein said translation lookaside buffer is an associative memory and said processor includes a primary lookaside buffer, said primary lookaside buffer including a subset of a plurality of entries found within said translation lookaside buffer, said transmitting step further comprising the steps of:

locating an entry within said primary lookaside buffer corresponding to a portion of said requested virtual address in response to an attempted access of said hierarchical memory system;

determining an associativity set of said translation lookaside buffer from which said entry within said primary lookaside buffer was loaded, in response to said step of locating an entry within said primary lookaside buffer;

transmitting said associativity set from said primary lookaside buffer to said cache directory, in response to said determining step.

4. The method of according to claim 1, wherein said translation lookaside buffer includes a virtual translation lookaside buffer containing virtual addresses and a real translation lookaside buffer containing real addresses, said step of locating a first entry in said translation lookaside buffer further comprising the steps of:

locating an entry in said virtual translation lookaside buffer corresponding to said hashed upper portion of said requested virtual address; and signaling a translation lookaside buffer hit in response to said step of locating an entry in said virtual translation lookaside buffer.

5. The method according to claim 4, said comparing step further comprising the step of:

signaling a cache hit responsive to said step of signaling a translation lookaside buffer hit and said first entry being equal to said second entry of said translation lookaside buffer.

6. The method according to claim 5, said method further comprising the step of:

accessing said data stored within said data block for utilization by said processor responsive to said step of signaling a cache hit.

7. The method according to claim 1 further comprising the step of:

responsive to the execution, within said data processing system, of an instruction to invalidate an entry in said translation lookaside buffer, purging all entries within said cache directory which reference said entry in said translation lookaside buffer.

8. The method according to claim 7, wherein said purging step further comprises the steps of:

locating an entry within said cache directory;

comparing said entry within said cache directory with an associativity set for congruence;

responsive to the occurrence of congruence, determining if said entry within said cache directory was modified;

responsive to said entry within said cache directory being modified, storing said associated data block in a lower level memory within said hierarchical memory system; and emptying said entry within said cache directory.

9. The method according to claim 1 wherein said address is a real address, further comprising the step of:

storing, within an entry in said translation lookaside buffer, a pseudo real address to virtual address mapping of said real address.

10. A data processing system for accessing a hierarchical memory system utilizing an address, wherein said data processing system includes a processor and said hierarchical memory system includes a cache memory indexed by a cache directory and a main memory indexed by a translation lookaside buffer, comprising:

means for transmitting an associativity set corresponding to a requested virtual address from said processor to said cache directory in response to an attempted access of said hierarchical memory system;

means for performing a hashing function on an upper portion of said requested virtual address;

means for locating a first entry in said translation lookaside buffer corresponding to said hashed upper portion of said requested virtual address;

means for locating an entry in said cache directory utilizing a lower portion of said requested virtual address, said entry in said cache directory including a congruence class field and having an associated data block in said cache memory;

means for locating a second entry in said translation lookaside buffer utilizing a pointer which includes said congruence class field and said transmitted associativity set; and means for comparing said first entry in said translation lookaside buffer and said second entry in said translation lookaside buffer to verify the validity of data within said data block for said requested virtual address.

11. The data processing system according to claim 10, further comprising:

means for accessing said data within said data block for utilization by said processor responsive to said first entry being equal to said second entry of said translation lookaside buffer.

12. The data processing system according to claim 10, wherein said translation lookaside buffer is an associative memory and said processor includes a primary lookaside buffer, said primary lookaside buffer including a subset of a plurality of entries found within said translation lookaside buffer, said means for transmitting further comprising:

means for locating an entry within said primary lookaside buffer corresponding to a portion of said requested virtual address in response to an attempted access of said hierarchical memory system;

means for determining an associativity set of said translation lookaside buffer from which said entry within said primary lookaside buffer was loaded, in response to said means for locating an entry within said primary lookaside buffer;

means for transmitting said associativity set from said primary lookaside buffer to said cache directory, in response to said means for determining.

13. The data processing system according to claim 10, wherein said translation lookaside buffer includes a virtual translation lookaside buffer containing virtual addresses and a real translation lookaside buffer containing real addresses, said means for locating a first entry in said translation lookaside buffer further comprising:

means for locating an entry in said virtual translation lookaside buffer corresponding to said hashed upper portion of said requested virtual address; and means for signaling a translation lookaside buffer hit in response to said means for locating an entry in said virtual translation lookaside buffer.

14. The data processing system according to claim 13, said means for comparing further comprising:

means for signaling a cache hit responsive to said means for signaling a translation lookaside buffer hit and said first entry being equal to said second entry of said translation lookaside buffer.

15. The data processing system according to claim 14, further comprising:

means for accessing said data stored within said data block for utilization by said processor responsive to said means for signaling a cache hit.

16. The data processing system according to claim 10 further comprising:

responsive to the execution, within said data processing system, of an instruction to invalidate an entry in said translation lookaside buffer, means for purging all entries within said cache directory which reference said entry in said translation lookaside buffer.

17. The data processing system according to claim 16, wherein said means for purging further comprises:

means for locating an entry within said cache directory;

means for comparing said entry within said cache directory with an associativity set for congruence;

responsive to the occurrence of congruence, means for determining if said entry within said cache directory was modified;

responsive to said entry within said cache directory being modified, means for storing said associated data block in a lower level memory within said hierarchical memory system; and means for emptying said entry within said cache directory.

18. The data processing system according to claim 10 wherein said address is a real address, further comprising:

means for storing, within an entry in said translation lookaside buffer, a pseudo real address to virtual address mapping of said real address.

* * * * *